(12) United States Patent
Neuman

(10) Patent No.: US 9,767,527 B2
(45) Date of Patent: Sep. 19, 2017

(54) DIAMOND-BASED TRADEABLE INSTRUMENT SECURITY SYSTEM

(71) Applicant: Isaac Neuman, Gauteng (ZA)

(72) Inventor: Isaac Neuman, Gauteng (ZA)

(*) Notice: Subject to any disclaimer, the term of this patent is extended or adjusted under 35 U.S.C. 154(b) by 331 days.

(21) Appl. No.: 14/367,583

(22) PCT Filed: Nov. 23, 2012

(86) PCT No.: PCT/ZA2012/000086
§ 371 (c)(1),
(2) Date: Jun. 20, 2014

(87) PCT Pub. No.: WO2013/078484
PCT Pub. Date: May 30, 2013

(65) Prior Publication Data
US 2015/0081506 A1 Mar. 19, 2015

(30) Foreign Application Priority Data
Nov. 27, 2011 (ZA) .................. 2011/03898

(51) Int. Cl.
*G06Q 40/00* (2012.01)
*G06Q 40/04* (2012.01)
(Continued)

(52) U.S. Cl.
CPC .............. *G06Q 90/00* (2013.01); *A45C 11/16* (2013.01); *A45C 13/18* (2013.01); *B65D 85/54* (2013.01);
(Continued)

(58) Field of Classification Search
CPC ........ G06Q 30/02; G06Q 40/00; G06Q 40/04; B44C 1/1737; B65D 85/00; B65D 85/54;
(Continued)

(56) References Cited

U.S. PATENT DOCUMENTS 4,364,472 A 12/1982 Waldmeier
5,033,774 A * 7/1991 Benardelli ............ A45C 11/24
206/0.82

(Continued)

FOREIGN PATENT DOCUMENTS

AU 624669 6/1992
WO 2010063041 6/2010

OTHER PUBLICATIONS

International Search Report dated Apr. 29, 2013, issued in PCT Patent Application No. PCT/ZA2012/000086, 5 pages.

(Continued)

*Primary Examiner* — Clifford Madamba
(74) *Attorney, Agent, or Firm* — Grossman Tucker Perreault & Pfleger PLLLC

(57) ABSTRACT

A tradeable commodity or instrument, a trading system for a plurality of such commodities, a method of trading using such a system and security systems related thereto. The tradeable instrument comprises a secure container constituted by a transparent cover (12), a stone holder pad (14), a set of diamonds (15), a diamond or stone holder (16), a data card (18), a bottom cover (20) and a tamper evident band (22) interconnected into a secure, tamper-evident envelope. The data card (18) incorporates physical and digital security features. In addition, at least one externally readable programmable logic device is incorporated in the tradeable instrument card. The tamper evident band (22) is shrunk onto the tradeable instrument card and includes physical security features in the form of holographic foils incorporated in the band.

10 Claims, 2 Drawing Sheets

(51) Int. Cl.
    *G06Q 90/00*     (2006.01)
    *A45C 11/16*     (2006.01)
    *A45C 13/18*     (2006.01)
    *B65D 85/00*     (2006.01)

(52) U.S. Cl.
    CPC ............ G06Q 40/00 (2013.01); G06Q 40/04 (2013.01); *A45C 2200/10* (2013.01); *B65D 2203/12* (2013.01); *B65D 2211/00* (2013.01)

(58) Field of Classification Search
    CPC ............ B65D 2211/00; B65D 2203/02; B65D 2203/06; B65D 2203/12
    USPC .......................................................... 705/37
    See application file for complete search history.

(56) References Cited

U.S. PATENT DOCUMENTS

| | | | |
|---|---|---|---|
| 5,318,816 A * | 6/1994 | Yin | B44C 1/1737 428/343 |
| 2005/0184871 A1 | 8/2005 | Coste | |
| 2009/0319336 A1 * | 12/2009 | Mehta | G06Q 30/02 705/7.35 |
| 2011/0146211 A1 | 6/2011 | LaTrobe | |

OTHER PUBLICATIONS

International Written Opinion dated Apr. 29, 2013, issued in PCT Patent Application No. PCT/ZA2012/000086, 6 pages.

* cited by examiner

DIAMOND-BASED TRADEABLE INSTRUMENT SECURITY SYSTEM

FIELD OF THE INVENTION

This invention relates to a tradeable commodity, a trading system for a plurality of such commodities, a method of trading using such a system and security systems related thereto.

BACKGROUND TO THE INVENTION

Commodities and the trading systems on which commodities are traded rely on the underlying fungibility of the commodity—a commodity is more or less fungible depending on the extent to which individual units of the commodity are capable of substitution with one another. Examples of highly fungible commodities are crude oil, precious metals, and currencies. Fungibility has little to do with liquidity—a commodity is liquid and tradeable if it is easily exchangeable for money or another commodity. The measure of the fungibility of a commodity, on the other hand, is determined by the ease with which one unit of the commodity can be exchanged for another substantially equivalent unit of the same commodity at the same time and place.

Precious stones are generally prized for their individual uniqueness, which, by definition, tends to detract from the commodity value thereof.

Individual diamonds, for instance, are unique and diamond prices vary widely notwithstanding attempts by the diamond industry to develop a standardised quality assessment that depends on the caratage, colour, clarity and cut (the proverbial 4-C's of the diamond industry) or such tools as the Rapaport Diamond Report, which is published every week as a price reference.

As a rule therefore, diamonds are not readily interchangeable and are therefore not considered to be highly fungible. Some firms offer "investment-grade" diamonds for sale to the public, often coupled with buyback guarantees in terms of which they undertake to buy the diamond from the purchaser at or near the purchase price within a specified period. This is a far cry however, from the manner in which precious metals are traded as commodities.

This invention proposes means to combine individually non-uniform, non-standard, relatively non-fungible valuable items, such as diamonds, into a largely standardised, fungible tradeable commodity as well as a trading system for a plurality of such commodities, a method of trading using such a system and security systems related to the above.

SUMMARY OF THE INVENTION

According to this invention a tradeable instrument comprises:
- a secure tamper evident envelope within which a plurality of relatively similar, individually non-uniform, non-standard valuable items (such as diamonds) are securely contained;
- the valuable items each being selected for a declared value according to a declared valuation method and the contained valuable items being combined such that the sum of the values of the valuable items contained within the tradeable instrument is substantially equal to the sum of the declared values of substantially similar valuable items contained in one or more similar, like valued tradeable instruments;
- the secure tamper evident envelope including an externally readable digital data store; and
- the data recorded in the digital data store including data pertaining to physical attributes unique to the valuable items contained within the envelope.

The term "equal", when used with reference to the comparative values of like or comparable tradeable instruments, must not be interpreted in an absolute sense. Due to the fact that the valuable items are, by definition, individually non-uniform, non-standard items, each collection of valuable items will be of no more than roughly equal value to a comparable collection of valuable items. With diligent selection and the combination of a sufficient number of valuable items however, it is possible to ensure that the value deviation between comparable instruments falls within a relatively small deviation range. The deviation range will be declared and unit pricing will preferably be set at the lowest value within the range.

The term "declare" in this specification, includes any means of making known and publicising the declarations required in respect of the instruments, such as unit values and the valuation method used in valuing the valuable items, generally to the public and specifically to persons wishing to trade the instruments.

One or more such declarations may be made by means of information display means associated with the tradeable instrument.

The information display means may be constituted by one or more of printing in or on the tradeable instrument or a print medium or on-board certificate incorporated in the tradeable instrument, the digital data store incorporated in or on the tradeable instrument, one or more discrete printed certificates associated with the tradeable instrument and stored remotely of the tradeable instrument or one or more digital data stores associated with the tradeable instrument and stored remotely of the tradeable instrument.

The association with the tradeable instrument may conveniently be by means of inclusion of the display means into the tradeable instrument or by reference to a unique attribute of the tradeable instrument, such as a unique number assigned to and incorporated in or on the tradeable instrument.

In the preferred form of the invention, the tradeable instrument envelope is constituted by a container made up of two halves that are secured together to envelop the valuable items.

In this form of the invention, the tradeable instrument container may include a tamper evident band secured over the joint between the container halves.

The tamper evident band is preferably adapted to constitute a digital data store in which certificate data and valuable item physical attribute data may be recorded, whether encrypted or otherwise.

The tamper evident band may constitute the primary digital data store or it may constitute an alternative or secondary digital data store.

In the preferred form of the invention, the primary digital data store in each tradeable instrument envelope is constituted by a secure data carrier including certificate data and valuable item physical attribute data recorded on a programmable logic device securely incorporated into the envelope. All or some of the data stored in the data carrier may be encrypted. The programmable logic device may be one or more of a magnetic stripe device, a bar code (two-dimensional or three-dimensional), an externally readable microchip, a RFID tag or the like.

In such a form of the invention, the tamper evident band will constitute a secondary digital data store.

The valuable items are preferably low mass, high value items such as precious stones, particularly diamonds, a number of which are securely assembled into a secure, tamper-evident envelope to define a tradeable instrument.

To obtain comparable cumulative values across similar, like valued diamond-based instruments, preferably ten stones are selected per tradeable instrument.

The invention includes a commodity trading system including a plurality of the above mentioned tradeable instruments and means to make and publicise the declarations required in respect of the tradeable instruments such as unit values and the valuation method used in valuing the valuable items.

In the preferred form of the invention, the means to make and publicise the declarations required in respect of the instruments may conveniently include one or more data carriers incorporated in each instrument in the trading system and a remotely stored certificate, whether digital or human readable or both, in respect of each instrument in the system.

The commodity trading system is preferably constituted by a computer network that includes the publicising means, means to market and sell the instruments between parties to the trading system and payment and banking mechanisms to settle payments within the system.

In this embodiment of the invention the computer network forming part of the system may conveniently include means to trade in certificates associated with tradeable instruments instead of or in addition to trading in actual instruments.

The invention includes a method of trading comprising the steps of:
first valuing a predetermined number of relatively similar, individually non-uniform, non-standard valuable items according to a predetermined valuation method;
selecting and grouping the valuable items so valued into sets of equal numbers and substantially equal combined values, the valuable items being selected such that the sum of the values of the valuable items in each set is substantially equal to the sum of the values of the valuable items making up each of the other sets of valuable items;
installing each set of valuable items securely in a secure, tamper evident envelope to define a number of tradeable instruments each having a substantially equal value; and
declaring the valuation method and the value of the contained valuable items in respect of each tradeable instrument.

With diamond values being established largely on the basis of the carat, clarity, colour and cut characteristics of the stones, the method may conveniently include the preliminary step of implementing a cutting regime in respect of all the stones according to a constant (or preferably a predetermined minimum) cut value (for instance "very good and up/ideal also known as perfect only") and, in a subsequent step, using that cut value for purposes of valuation in respect of each stone in each tradeable instrument.

Such a preliminary step introduces a degree of standardisation to the valuation method by removing "cut" as a variable from the four assessment variables of caratage, colour, clarity and cut, thereby reducing the valuation method to a three-variable matrix, which is desirable since it is the intention, as far as possible, to standardise and commoditise the tradeable instrument of the invention.

In addition, and further to standardise the tradeable instrument, the stones making up the tradeable instrument may be selected to have a total, cumulative caratage that is equal to or greater than a predetermined total caratage per tradeable instrument (with a declared variation in the caratage value).

BRIEF DESCRIPTION OF THE DRAWINGS

The invention will be further described with reference to the accompanying drawings in which.

DESCRIPTION OF EMBODIMENTS OF THE INVENTION

Figure 1:
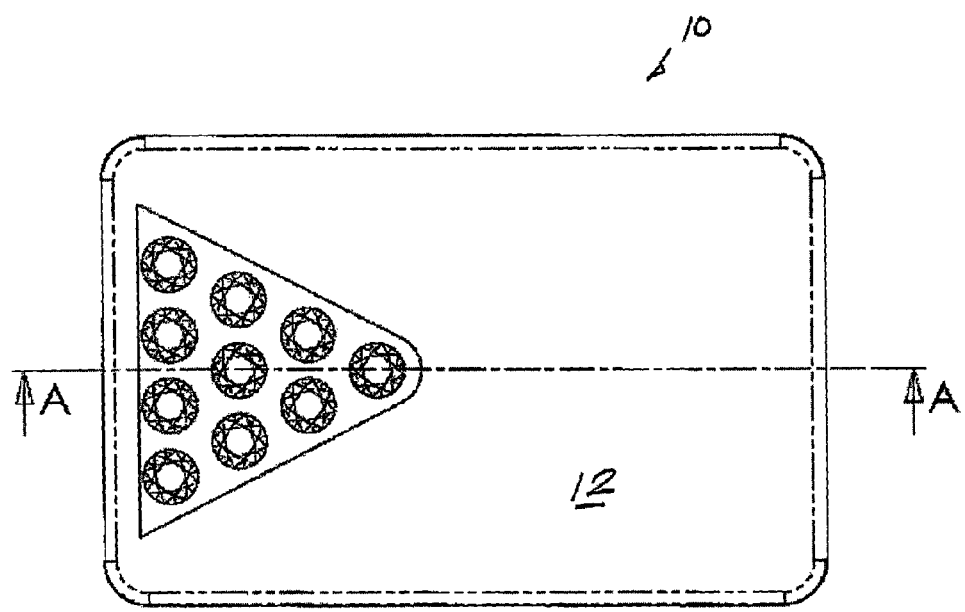
FIG. 1 is a diagrammatic plan view of an example of a tradeable instrument according to the invention, implemented in a credit card-shaped and -sized unit.
Figure 2:
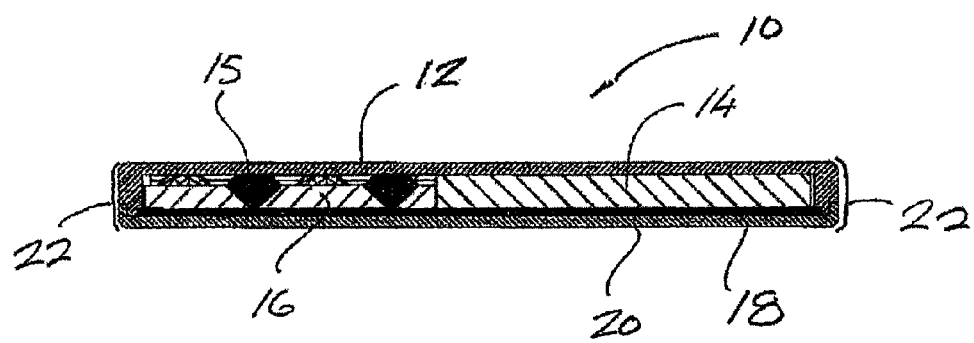
FIG. 2 is an elevation section on a line A-A in FIG. 1.
Figure 3:
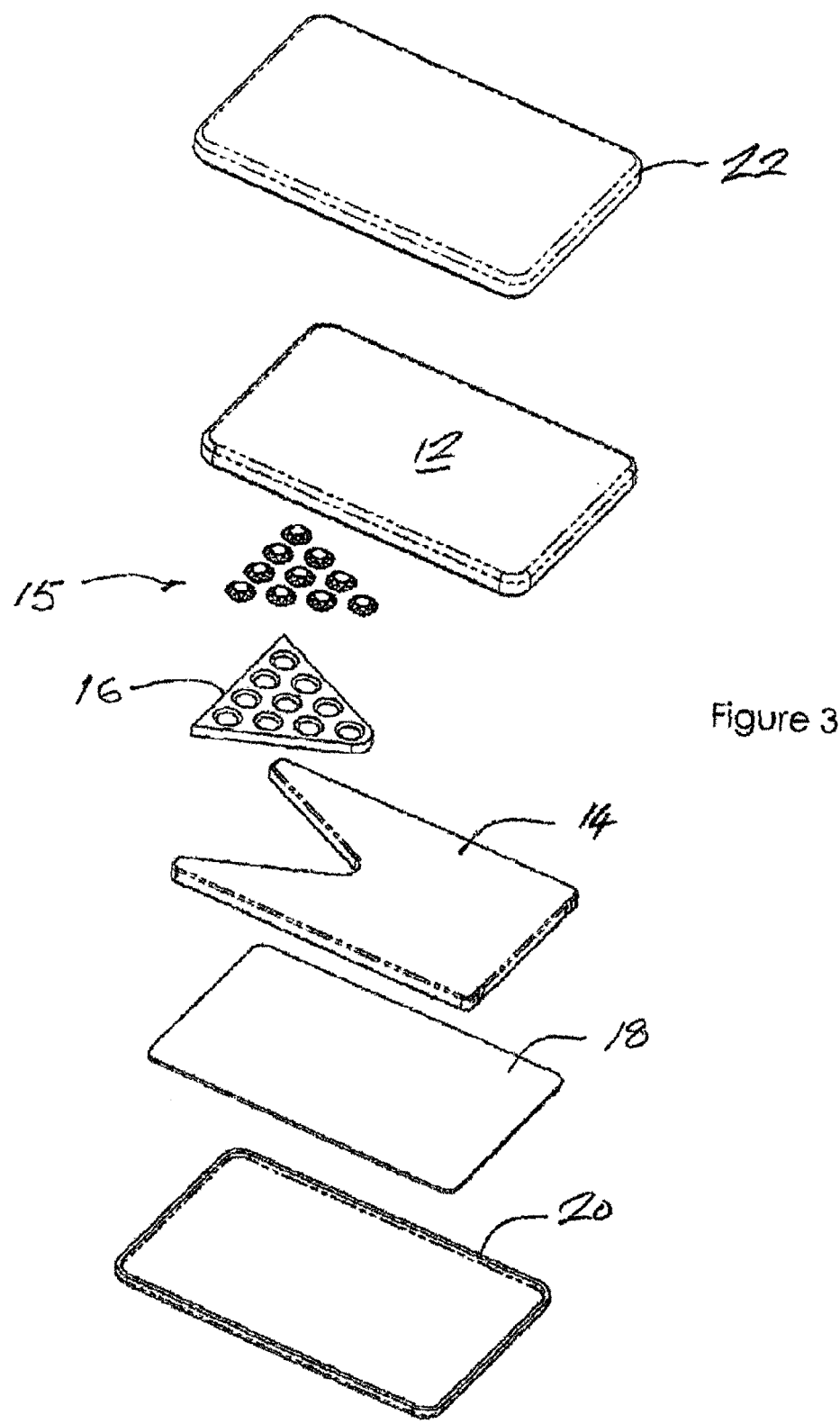
FIG. 3 is a diagrammatic plan view of the tradeable instrument of FIGS. 1 and 2 in exploded isometric view.

A tradeable instrument, by definition, is a financial instrument on which a buyer and seller agree a price and then effect a contractual exchange of ownership of the instrument. Certain tradeable instruments have come to acquire the nature of highly fungible commodities, which is desirable since this increases the ease and certainty with which one unit of the commodity can be exchanged for another substantially equivalent unit of the same commodity at the same time and place.

In the field of commodities trading, precious metals are something of an anomaly—precious metals constitute highly fungible commodities, but have nevertheless not lost their individual, decorative appeal and use.

Natural precious stones however, have not been the subject of similar commoditisation. This is attributable, in the main, to the fact that precious stones, such as diamonds in particular, are prized specifically for their individual uniqueness, but also to the lack of a terminal market. Most commodities have terminal markets, and some form of commodities exchange, clearing houses and trading mechanisms which do not exist for diamonds.

Diamonds in larger sizes have become increasingly available and valuable, but no readily understood or standardised pricing system has yet been established. As an example, the weekly Rapaport Diamond Report publishes matrices of diamond prices for cut, colour and clarity within size bands. The price matrix for brilliant cuts alone normally exceeds 1,000 entries, which is only achieved by grouping some grades together. The Rapaport Diamond Report also displays considerable price shifts near the edges of the size bands. For instance a 49 point stone may list at $1,000 less than a 50 point stone of similar quality, which appears to be a relatively large difference for such a small difference in size.

In addition, while there are numerous diamond grading laboratories, such as the market-leading Gemological Institute of America (GIA) and the laboratories affiliated to CIBJO (Confédération Internationale de la Bijouterie, Joaillerie et Orfèvrerie, also known as the World Jewellery Confederation), there is no easy way for investors or dealers to know the relative competence and integrity of each or whether there is any commercial pressure on any such a laboratory to upgrade marginal stones or lose business to other facilities that are prepared to reduce standards.

To further cloud the issue of fungibility, the non-linear pricing of different sizes and stones of different carat mass means that it is not realistic to exchange, for example, two 25 point stones (total mass 100 mg) for one 50 point stone (of 100 mg). With commodities such as gold on the other hand, it is clear that one 100 g bar is worth the same as two 50 g bars, assuming the same metal grade and quality.

It is an object of this invention to propose a tradeable instrument by means of which these objections to the use of precious stones, particularly diamonds, may be overcome and by means of which the terminal market requirements of standard quality (or a known quality variation factor), quantity and fungibility may be fulfilled.

The invention will be described with reference to a diamond-based tradeable instrument, but it will be appreciated that this is done purely for illustrative purposes and it is not intended to limit the invention only to diamonds, since the invention will find application in respect of tradeable instruments based on any relatively similar, individually non-uniform, non-standard valuable items. The advantage of diamonds however is their high value per unit mass, which makes them easy to store and transport and gives them an extremely condensed value and portability.

In summary, the tradeable instruments of this invention are basically card units, roughly the plan outline size of a conventional credit card, but slightly thicker, to accommodate a number of diamonds that are incorporated into the tradeable instrument card. The card assembly itself is a secure, tamper-evident envelope that incorporates a data insert with multiple layers of physical and digital security to establish both the authenticity of the instrument as well as its identity. In developing a terminal market for the tradeable instruments of the invention, it is unlikely that the physical tradeable instrument cards will exchange hands for the most part. Instead, certificates which map to the cards are likely to be the objects traded.

The tradeable instrument card 10 illustrated in the drawings is essentially a secure container constituted by a transparent cover 12, a stone holder pad 14, a set of diamonds, a diamond or stone holder 16, a data card 18, a bottom cover 20 and a tamper evident band 22 (all simplified in this drawing). The stone holder pad 14 may conveniently be shaped to locate the stone holder within the container. The various layers of the tradeable instrument card 10 are preferably of a suitably durable plastics material or combination of materials.

After insertion of the set of diamonds 15 into the stone holder 16, the various layers of the tradeable instrument card 10 will be secured together. The tradeable instrument card 10 is, in plan outline, dimensioned to equate the size of a conventional credit card. The various layers and the inclusion of the set of diamonds make the tradeable instrument card 10 slightly thicker than a credit card. The layers of the tradeable instrument card 10 are interconnected into a secure, tamper-evident envelope by the securement of the top cover 12 to the bottom cover 20 to envelop the contents constituted by the diamonds 15, the stone holder 16, the stone holder pad 14 and the data certificate 18.

The tradeable instrument card 10 generally and the data card 18 in particular is printed with identifying information. The data card 18 may incorporate physical and digital security features in the form of holograms (preferably holographic foils as will be described below).

In addition, one or more programmable logic devices are incorporated in the tradeable instrument card 10 in the form of a magnetic stripe device or a bar code (two-dimensional or three-dimensional), which may be included in the data card 18 to be externally readable. Alternatively, or in addition, the programmable logic device may be an externally readable transponder microchip, a RFID tag or the like located within the card container. A RFID tag, for instance, may be located between the stone holder pad 14 and the data sheet. A transponder chip on the other hand, may be located within the container sheet.

The stored data includes data pertaining to the physical attributes of the diamonds 15.

One well known diamond identification technique is based on the understanding that each diamond, no matter how similar in cut to a comparable diamond it might be, has unique light reflection and refraction characteristics. This identification technique involves the use of a narrow beam of light (preferably laser light) that is applied to the diamond and the reflection (or refraction) pattern (which is unique to that diamond) is then recorded. This technique can be applied to each of the diamonds 15 individually or to the diamonds 15 as a group and the resultant reflection or refraction data will then be recorded on the programmable logic device as physical attribute data.

The tamper evident band 22 is a band that is applied around the periphery of the tradeable instrument card 10 once the top and bottom covers 12, 20 have been secured together.

The tamper evident band 22 is shrunk onto the tradeable instrument card 10 (in one form of the invention) and may incorporate physical security features in the form of holographic foils incorporated in the band, for instance.

The tamper evident band constitutes a secondary digital data store in which certificate data and valuable item physical attribute data are recorded, preferably in encrypted form.

The material of the tamper evident band 22 is selected such that, if any attempt is made to open the tradeable instrument card 10 (to replace the diamonds 15 therein with less valuable stones for instance), the data recorded on the band 22 will become unreadable or corrupted (unreadable in parts). If such a compromised card is presented to a dealer in the trading system, the dealer will scan the band in an attempt to read the data recorded thereon. The resultant data mis-read will provide an immediate indication that the tradeable instrument card 10 is compromised.

In the preferred terminal market for the tradeable instruments of the invention, it is unlikely that the physical tradeable instrument cards will exchange hands for the most part. Instead, certificates which map to the cards are likely to be the objects traded.

The cover 12 has a dependent skirt about its periphery and the lower cover 20 has an upstanding rim. The skirt and the rim are formed with complemental formations that are adapted to interdigitate to provide a first mechanical connection between the upper and lower covers 12, 20.

The stone holder pad 14 is conveniently formed with a recess within which the stone holder 16 is a complementary fit. The stone holder 16 is formed with a plurality of sockets extending centrally along its length—ten sockets being formed in the tradeable instrument card 10 in the example illustrated.

The tradeable instrument card 10 is assembled by first filling a stone holder 16 with diamonds. To do this, a diamond holder is placed in each socket of the stone holder 16. The diamond holders are a snug fit in the sockets and are each formed with a conical recess shaped complementally to the pavilion of a brilliant cut diamond. The diamonds 15 to be included in the tradeable instrument card 10 are placed with their pavilions in the conical recesses of the diamond holders 22. With the diamonds 15 in place, the stone holder 16 is located in the stone holder pad 14, which is then installed within the upstanding rim of a lower cover 20 within which a data card 18 has been pre-installed.

The upper and lower covers 12, 20 are then secured to one another by ultrasonic welding or the like, permanently to envelop and encase the diamonds 15 in the tradeable instrument card 10.

The tradeable instrument card 10 is then electronically registered for trading on the terminal market and paired with a suitable digital certificate for trading purposes.

Information storage and data security can take many forms and will depend on the sophistication of the security features incorporated in the tradeable instrument card 10.

The trading system and the certificate pertaining to the tradeable instrument card 10 can be used to record and display the declarations required in respect of the tradeable instrument card 10. For instance, a subscriber-only application may be provided to investor owners of the tradeable instrument cards 10 by means of which they may access this information over the internet.

To this end, either or both the system and the certificate may be used to record the declared value of the tradeable instrument card 10 at the date of issue thereof together with the declared valuation method at issuance.

In addition, more detailed information can be recorded in respect of each of the diamonds 15 included in the tradeable instrument card 10. If the diamonds are certified, for instance by the GIA, live links could be provided to digital copies of the GIA certificates.

Further security features include the use of inks that can only be seen under ultra-violet light or the plastics material of the tradeable instrument card 10 can be adapted to indicate any attempt at compromising the integrity of the tradeable instrument card 10 envelope, by discoloration as a result of externally applied stress for instance.

Notwithstanding that diamonds have unique features, they are capable of categorisation into established categories for which pricing criteria are available. For purposes of valuation according to the invention it may be found advantageous to use multiple valuation methods and to and declare (or quote) a plurality of values or a value range for each tradeable instrument card 10 or tranche of tradeable instruments, a tranche being one of many variants of the tradeable instruments of the invention, similar to a currency or commodity denomination, with each tradeable instrument in the tranche having a quality and value range that is statistically insignificant for purposes of valuation of each tradeable instrument in the tranche.

The important thing however, is to ensure that all the tradeable instrument cards 10 in a particular tranche contain equal quantities of diamonds, each being selected for a declared value according to a declared valuation method and the diamonds being combined such that the sum of the values of the diamonds contained within each tradeable instrument card 10 in that tranche of tradeable instrument cards 10 is substantially equal to the sum of the declared values of the valuable items contained in the other tradeable instrument cards 10 in that tranche of instrument cards 10.

As a means of standardising valuation methodologies and increasing the fungibility of the tradeable instrument cards 10, it is desirable to reduce the number of categorisation variables used in the valuation of the diamonds.

One variable that can be controlled to a substantial extent, is the cut of the diamonds. To this end, it is proposed, for the tradeable instrument cards 10 of the invention, to adopt a standard cut across all the diamonds used for the tradeable instrument cards 10. For instance, each tradeable instrument card 10 will contain only Brilliant-cut diamonds.

The cut quality will also be kept standard, using a predetermined minimum cut value (for instance "very good and up/ideal—also known as perfect only").

This will enable the application of a three-dimensional valuation method which is less variable than the conventional four-dimensional pricing matrix conventionally used in the valuation of diamonds (thereby removing "cut" from the four C's of cut, colour, clarity and carat mass). With the cut assessment being standardised, the diamonds need be assessed for quality only (clarity and colour), since carat mass can be objectively measured by weighing.

In an exemplary valuation scheme, the diamonds to be included in the tradeable instrument cards 10 are first assessed for quality against a predetermined quality matrix, the details of which will be declared when the tradeable instrument cards 10 are released for trading. As an example, the diamonds may be assessed and graded in respect of colour and clarity according to the methodologies and nomenclature of the Gemological Institute of America (GIA).

According to GIA methodologies, colour is ranked alphabetically from grade D (colourless) to grade Z (light yellow). For the tradeable instrument cards 10 of the invention it is preferred to use only diamonds of clarity grade D-E-F (colourless) and G-H-I-J (near colourless), each forming a grading group on the quality matrix illustrated in Table 1 below.

The GIA diamond clarity scale is divided into six categories and eleven grades, with the clarity categories and grades relevant to this invention being set out below:

Flawless (FL)
Internally Flawless (IF)
Very Very Slightly Included (VVS)—this category is divided into two grades in which VVS1 denotes a higher clarity grade than VVS2
Very Slightly Included (VS)—this category is divided into two grades in which VS1 denotes a higher clarity grade than VS2
Slightly Included (SI)—this category is divided into two grades in which SI1 denotes a higher clarity grade than SI2.

Using the above mentioned colour and clarity gradings, it is possible to grade and categorize most investment grade diamonds into one of four categories denoted ALPHA, BETA, GAMMA and DELTA in the two-axis matrix set out in Table 1 below, in which:

colour grades D-E-F (colourless) and G-H-I-J (near colourloess) respectively, each form one or two grading groups on the colour axis; and
clarity grades FL/IF; VVS1 and VVS2 and VS1; VS2; SI1 and SI2, respectively, each form one of two grading groups on the clarity axis:

TABLE 1

|  |  | FL/IF | VVS1 | VVS2 | VS1 | VS2 | SI1 | SI2 |
|---|---|---|---|---|---|---|---|---|
| COLOUR | D | ALPHA |  |  |  | BETA |  |  |
|  | E |  |  |  |  |  |  |  |
|  | F |  |  |  |  |  |  |  |
|  | G | GAMMA |  |  |  | DELTA |  |  |
|  | H |  |  |  |  |  |  |  |
|  | I |  |  |  |  |  |  |  |
|  | J |  |  |  |  |  |  |  |

Diamonds of equivalent cut and carat mass classified and graded into the ALPHA quadrant above (for instance diamonds with a colour grading D, E or F and a clarity grading of FL/IF, VVS1 or VVS2) will all have roughly equal quality values for purposes of calculating the price and value of the diamonds concerned.

The stones in each quality graded group are then sorted into mass groups for assembly into various tranches of tradeable instrument cards 10.

For example, a 10-carat tradeable instrument card tranche may be assembled, in which each tradeable instrument card in the tranche is made up of a 10-carat unit containing 10 diamonds of roughly 1 carat each, the combined mass of all the stones being 10 carats or more.

As a further example, a 5-carat tradeable instrument card tranche may be assembled in which each tradeable instrument card in the tranche is made up of a 5-carat unit containing 10 diamonds of roughly ½ carat (50 points) each, the combined mass of all the stones being as close as possible to 5 carats.

4 Carat-, 3 carat-, 2 carat- and 1 carat tranches are also envisaged. In each case (including the examples just described), variation from the declared individual stone mass in a unit will be permitted and declared.

An example of such a variation range is set out in Table 2 below:

TABLE 2

Permitted Mass Variation

| Mass Variation Range Individual Stones (carat) | | Total Instrument card 10 Mass 10 stones (carat) |
|---|---|---|
| 0.92-1.12 | ×10 diamonds | 10.0 |
| 0.45-0.57 | ×10 diamonds | 5.00 |
| 0.35-0.45 | ×10 diamonds | 4.00 |
| 0.25-0.35 | ×10 diamonds | 3.00 |
| 0.15-0.25 | ×10 diamonds | 2.00 |
| 0.08-0.15 | ×10 diamonds | 1.00 |

It will be appreciated that any combination of masses and mass ranges can be used and that such masses and mass ranges will vary from one tranche of tradeable instrument cards 10 to the next.

The use of multiple diamonds in each tradeable instrument card 10 makes it possible to obtain largely standard values in respect of the combined values of the diamonds in each tradeable instrument card 10 in each tranche (with acceptably low variations). In each case the diamonds in each tradeable instrument card 10 in a tranche will be combined such that the sum of the values of the diamonds (and possibly also the sum of the carat masses) in each tradeable instrument card 10 is substantially equal to the sum of the declared values (and masses) of the diamonds contained in the other tradeable instrument cards 10 in that tranche.

It is appreciated that notwithstanding the most careful selection, the diamonds used in the tradeable instrument cards 10 nevertheless remain individually non-uniform, non-standard items.

For this reason, the collection of diamonds contained in the tradeable instrument cards 10 in similar tranches will be no better than substantially equal in value. With diligent selection and the combination of a sufficient number of diamonds however, it is possible to ensure that the value deviation between comparable instrument cards 10 falls within a relatively small deviation range (statistically insignificant relatively to the total value of the tradeable instrument card 10). In addition the deviation range will be declared and pricing of the tradeable instrument card 10 will at all times be quoted and traded at the lowest value within the declared value range.

Like most commodities, the tradeable instrument cards 10 of the invention will require the setting up of terminal markets, including some form of commodities exchange, clearing houses and trading mechanisms. In this regard, the tradeable instrument card 10 of the invention will expand the traditional markets (jewellery and industrial) for diamonds by opening up numerous distinct markets, some of them investment markets where the physical exchange of the tradeable instrument cards 10 will not be required and some of the markets, such as a private investor market, which is designed to provide physical delivery and exchange of the tradeable instrument cards 10.

What is claimed is:

1. A tradeable instrument comprising:
a secure tamper evident envelope within which a plurality of relatively similar, individually non-uniform, non-standard valuable items are securely contained,
wherein the plurality of relatively similar, individually non-uniform, non-standard valuable items are each selected based on their declared value according to a declared valuation method, and are included in the secure tamper evident envelope such that the sum of the declared values of the plurality of relatively similar, individually non-uniform, non-standard valuable items within the secure tamper evident envelope is substantially equal to a declared value of the tradeable instrument and the sum of the declared values of substantially similar valuable items contained in one or more similar, like valued tradeable instruments;
the secure tamper evident envelope comprises a first externally readable digital data store that comprises first data stored therein, the first data comprising physical attribute data specifying unique physical attributes of each of the plurality of individually non-uniform, non-standard valuable items contained within the envelope;
the secure tamper evident envelope is in the form of a container comprising two halves that are secured together at a joint there between, so as to envelop the plurality of relatively similar, individually non-uniform, non-standard valuable items; and
the tradeable instrument further comprises a tamper evident band secured over the joint, the tamper evident band comprising a second digital data store.

2. The tradeable instrument of claim 1, wherein the second digital data store comprises second data stored therein, the second data comprising certificate data and physical attribute data of each of the plurality of relatively similar, individually non-uniform, non-standard valuable items.

3. The tradeable instrument of claim 2, wherein the second data comprises encrypted data, the encrypted data comprising said certificate data and physical attribute data.

4. The tradeable instrument of claim 1, in which the plurality of relatively similar, individually non-uniform, non-standard valuable items are low mass, high value items which are securely disposed within the container.

5. The tradeable instrument of claim 1, wherein the plurality of relatively similar, individually non-uniform, non-standard valuable items are diamonds.

6. The tradeable instrument of claim 5, wherein the physical attribute data of said first data specifies physical attributes of said diamonds.

7. The tradeable instrument of claim 3, wherein:
the plurality of relatively similar, individually non-uniform, non-standard valuable items are diamonds; and
the physical attribute data in said first data and said second data specifies physical attributes of said diamonds.

8. The tradeable instrument of claim 1, wherein said first digital data store is selected from a programmable logic device, a magnetic strip, and a bar code.

9. The tradeable instrument of claim 8, wherein said first digital data store is a programmable logic device, the programmable logic device selected from the group consisting of an externally readable transponder microchip and a radio frequency identification (RFID) tag.

10. The tradeable instrument of claim 8, wherein:
said tamper evident band is a shrink fit band that is disposed around a periphery of the container; and
said second digital data store comprises second data stored therein, the second data comprising encrypted data, the encrypted data including physical attribute data of each of the plurality of each of the plurality of relatively similar, individually non-uniform, non-standard valuable items.

* * * * *